Sept. 20, 1960 J. K. CLAUSS 2,953,441
APPARATUS FOR SULFUR DIOXIDE DETERMINATION
Original Filed June 20, 1949 2 Sheets-Sheet 1
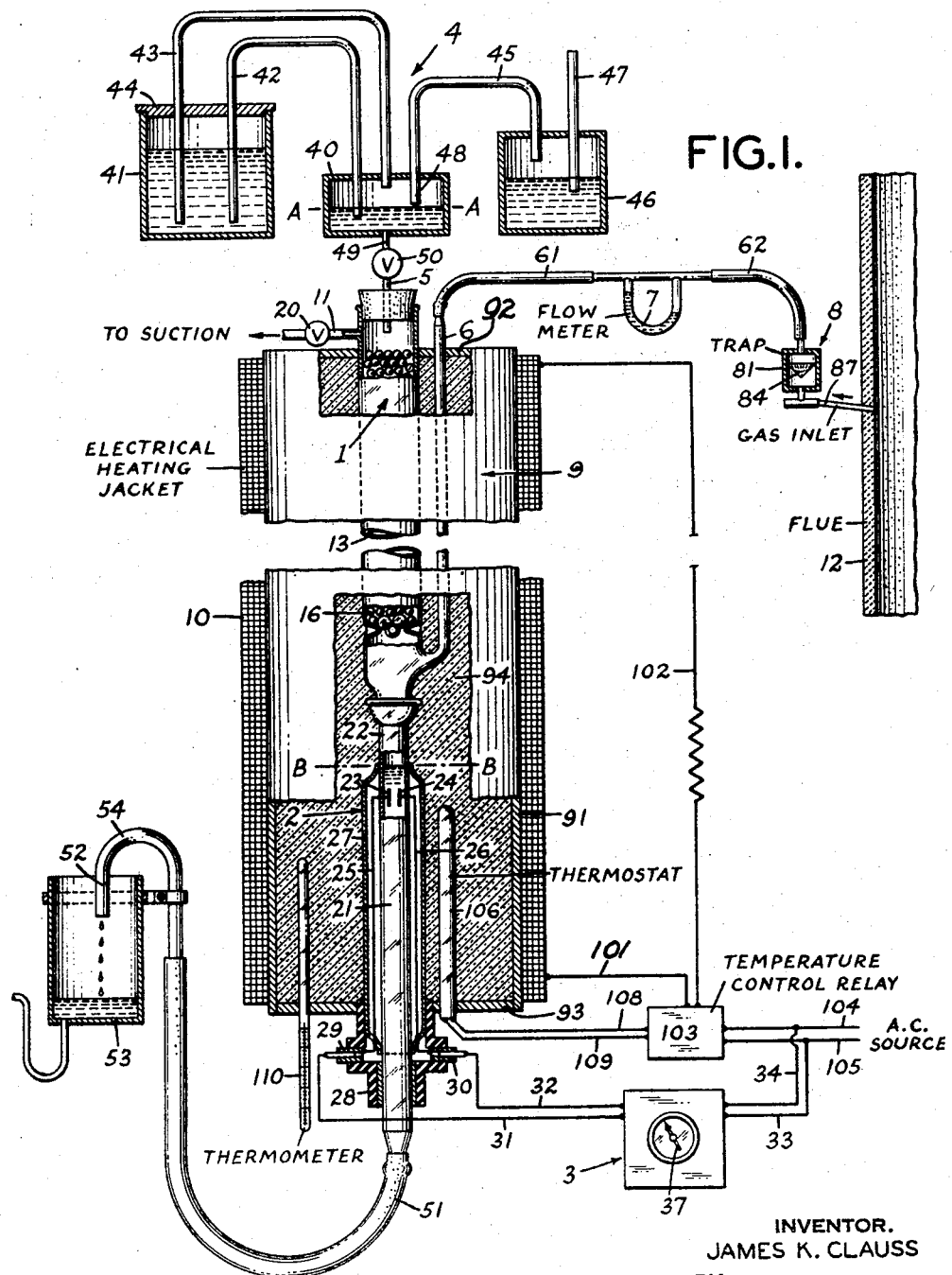
FIG.I.
INVENTOR.
JAMES K. CLAUSS
BY
ATTORNEY.

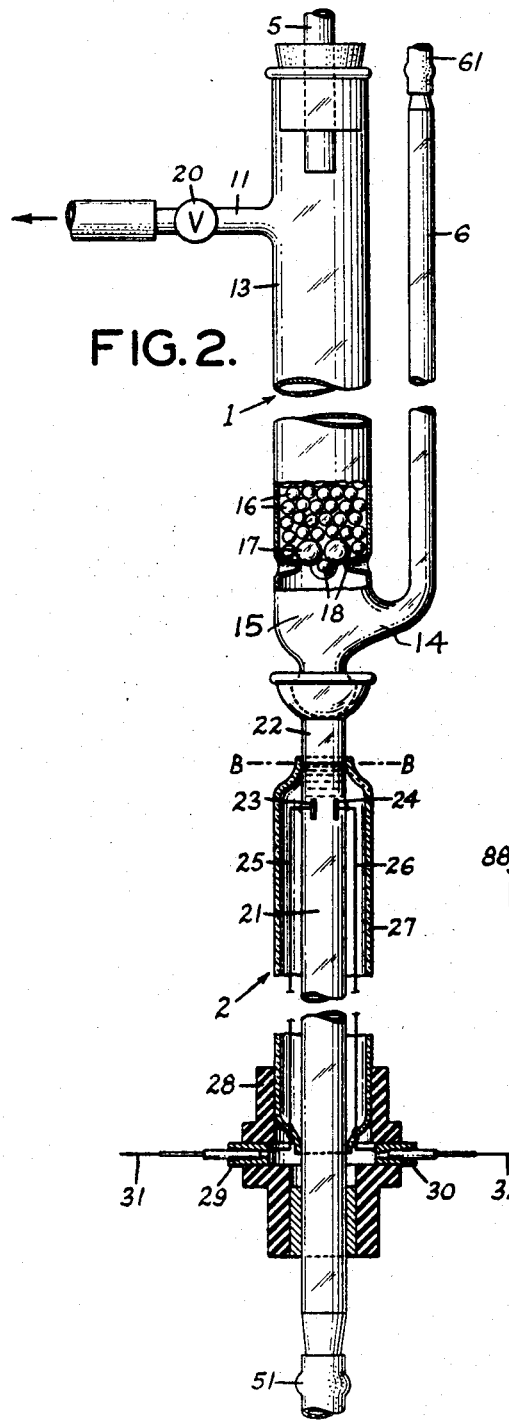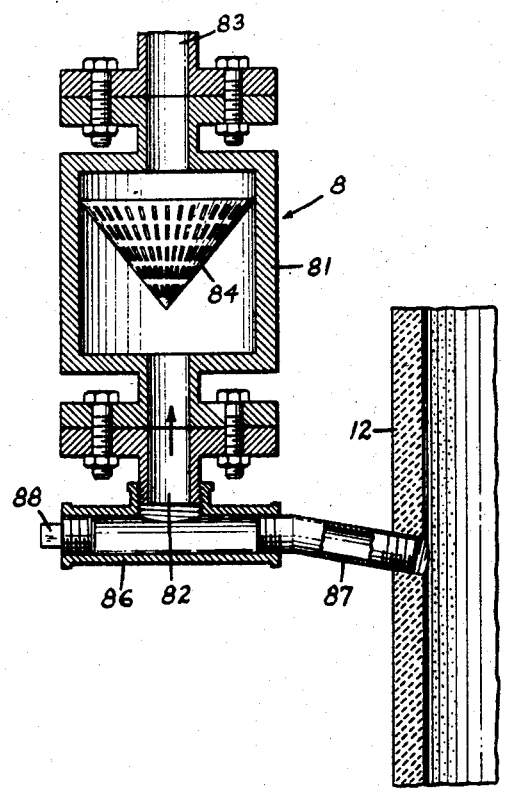

United States Patent Office 2,953,441
Patented Sept. 20, 1960

2,953,441

APPARATUS FOR SULFUR DIOXIDE DETERMINATION

James K. Clauss, Palo Alto, Calif., assignor to Allied Chemical Corporation, a corporation of New York Original application June 20, 1949, Ser. No. 100,269. Divided and this application Dec. 24, 1956, Ser. No. 630,169

5 Claims. (Cl. 23—255)

This invention relates to apparatus for determining the content of sulfur dioxide in a gas mixture. It relates more particularly to an improved apparatus for continuously determining and recording the concentration of sulfur dioxide in exit gases from the contact sulfuric acid process.

In the manufacture of sulfuric acid by the contact process, a mixture of sulfur dioxide and air is passed into contact with a catalyst whereby the sulfur dioxide is oxidized to sulfur trioxide, and the sulfur trioxide is then absorbed in sulfuric acid of suitable concentration. An exit gas from a contact sulfuric acid process may contain, for example, approximately 0.3% by volume of sulfur dioxide, approximately 10% by volume of oxygen, and the remainder nitrogen and water vapor, together with a negligibly small amount of carbon dioxide. The gas also may contain a small amount of sulfuric acid mist, either mechanically carried from the absorbers or formed by combination of unabsorbed sulfur trioxide with water vapor in the gas.

It is desirable from the standpoint of efficient operation, that the exit gases from the process contain a minimum amount of sulfur dioxide. It is also desirable, in the interest of avoiding contamination of the atmosphere, that the content of sulfur dioxide in the exit gases be low. It is therefore important that the concentration of sulfur dioxide in the exit gases be readily determined.

It is known to measure the concentration of sulfur dioxide in a gas mixture by aspirating a sample of the gas mixture through a solution containing a measured amount of standard iodine solution and a starch indicator until the solution is decolorized (the "Reich test"). This test is relatively simple but is gives only spot information and fails to indicate how the process is functioning between tests. Further, it requires the attention of an operator to carry out the test.

It is also known to determine and record continuously the concentration of sulfur dioxide in a gas mixture by absorbing the sulfur dioxide in a measured quantity of electrolyte of known electrical conductivity, such as an aqueous solution of hydrogen peroxide of known concentration, and measuring the change in electrical conductivity of the solution produced by absorption of the sulfur dioxide.

The known processes and devices for measuring the concentration of sulfur dioxide in a gas mixture by absorption require complete absorption of the sulfur dioxide present in the sample, and close control of the composition of the absorbent. As a consequence, rate of gas flow, rate of liquid flow, and temperature and pressure conditions are required to be accurately controlled in order to obtain reliable results.

A principal object of the present invention is to provide an improved apparatus for measuring the concentration of sulfur dioxide in a gas mixture in a more rapid and direct manner than heretofore.

Other objects of this invention are to provide apparatus for automatically determining and recording the concentration of sulfur dioxide in a flowing gas mixture which operates on an absorption principle but does not require exact proportioning of gas and liquid flow rates, nor complete absorption of the sulfur dioxide in the liquid, and which provides a greatly simplified instrument design.

A further object of the present invention is to provide apparatus for automatically and continuously determining and recording the concentration of sulfur dioxide in tail gases from the contact sulfuric acid process which operates on an absorption principle while permitting comparatively wide variations in the rate of gas flow, rate of liquid flow, and which does not require complete absorption of the sulfur dioxide.

Another object of the present invention is to provide apparatus for measuring the concentration of sulfur dioxide in a flowing gas mixture containing sulfur dioxide in varying concentration which is continuously responsive to variations in the concentration of sulfur dioxide.

Other objects will in part be obvious and will in part appear hereinafter.

According to the present invention, the concentration of sulfur dioxide in a gas mixture and especially the concentration of sulfur dioxide in tail gases from the contact sulfuric acid process is measured in terms of the electrical conductivity of a solution of sulfur dioxide in water in equilibrium with the gas mixture. I have discovered that the concentration of sulfur dioxide in a gas mixture, and especially in tail gases from the contact sulfuric acid process, can be measured by establishing a condition of equilibrium between the gas mixture and a solution of sulfur dioxide in distilled water under standardized temperature and pressure conditions, and measuring the electrical conductivity of the resulting solution. Since, in accordance with Henry's law, the concentration of sulfur dioxide in the resulting solution bears a constant relationship to the partial pressure of sulfur dioxide in the gas mixture in equilibrium with said solution, the electrical conductivity of the solution can be employed as an index of the concentration of the sulfur dioxide in the gas mixture. Hence, by proper calibration of the conductivity measuring instrument, the concentration of sulfur dioxide can be determined directly and constantly recorded.

I have further discovered that the oxidizing effect of oxygen in the tail gases from the contact sulfuric acid process can be rendered negligible by rapidly bringing the tail gases to equilibrium with the aqueous solution of sulfur dioxide and that this result can be accomplished by providing a scrubber in which a relatively large amount of the tail gases is contacted with a relatively small amount of distilled water, so that only a portion of the sulfur dioxide present in the gas mixture is absorbed by the water. This is contrary to prior processes and apparatus, which required absorption of the total amount of sulfur dioxide present in a measured sample of the gas mixture to be analyzed, and permits a simplification of the apparatus. By employing a relatively small amount of water it is only necessary to dissolve a small amount of sulfur dioxide to establish equilibrium conditions.

I have further discovered that if sulfuric acid mist is present in the tail gases, it can be removed by physical means (such as, trapping it by change in the velocity of the gas and separating out the precipitated liquid) without adversely affecting the determination of sulfur dioxide, inasmuch as the solubility of sulfur dioxide in sulfuric acid is low. Thus, by removing residual sulfuric acid from the tail gases without substantially removing other constituents of the gas mixture (by physical or chemical means), the determination of the electrical conductivity of the aqueous solution resulting from scrubbing the tail gases with a relatively small amount of distilled water under conditions of equilibrium provides a direct index of the concentration of sulfur dioxide in the tail gases.

The invention accordingly comprises the apparatus embodying features of construction, combination of elements and arrangements of parts, all as will be exemplified in the following detailed disclosure and illustrated in the accompanying drawings. The scope of the invention will be indicated in the claims.

A preferred form of apparatus embodying the present invention comprises means for intimately contacting a relatively large volume of the gas mixture with a relatively small volume of an aqueous solution of sulfur dioxide; a gas duct for introducing the gas mixture into said contact means; means for contacting resulting exit gases containing sulfur dioxide with water to form an aqueous solution of sulfur dioxide; means for withdrawing resulting exit gases; means for passing the aqueous solution of sulfur dioxide from the second contact means to the first contact means; an electrical conductivity cell connected to the first contact means and adapted to receive sulfur dioxide solution produced in the first contact means, said cell having spaced electrodes for use in measuring the electrical conductivity of the solution; a temperature-regulating means surrounding the first contact means, the conductivity cell and the gas duct for maintaining a substantially uniform temperature therein; means for maintaining the electrodes of the conductivity cell covered by said solution; and electrical measuring means connected to the electrodes for determining the electrical conductivity of the solution as an index of the concentration of sulfur dioxide in the gas mixture.

For a fuller understanding of the nature and objects of the invention, reference should be had to the following detailed description taken in connection with the accompanying drawings in which Figure 1 is a diagrammatic representation of a complete assembly of the apparatus, Figure 2 is an enlarged elevation, partly in section, of the scrubber and conductivity cell, and Figure 3 is a sectional elevation of the sulfuric acid trap.

Referring to the drawings, the various parts making up the complete assembly of apparatus shown in Figure 1 are a scrubber 1 for bringing the gas mixture to be tested into intimate contact with the water; a conductivity cell 2, connected to the scrubber and having platinized electrodes 23 and 24 which, with their associated measuring and recording instrument 3, measure and record the electrical conductivity of the aqueous solution of sulfur dioxide formed in the scrubber; a constant level device 4 connected to the scrubber by a tube 5, for supplying water to the scrubber; a gas duct 6 and its associated flow meter 7 and sulfuric acid trap 8, for introducing into the scrubber a portion of the exit gases from the sulfuric acid contact process whose concentration of sulfur dioxide is to be determined, and an exhaust conduit 11 for withdrawing gases from the scrubber. The scrubber 1, conductivity cell 2 and gas duct 6 are surrounded by a temperature-regulating jacket 9 which is electrically heated by a thermostatically controlled electric heater 10. The liquid outlet of the conductivity cell 2 is connected through a flexible tube 51 with an inverted U-tube 52 whose height is adjustable so as to vary the liquid level B—B in the conductivity cell 2.

The scrubber 1, as shown more clearly in Figure 2, is formed of a 20 mm. Pyrex glass tube 13 having a gas inlet 14 near the bottom thereof and the gas outlet 11 near the top thereof. The tube 13 is filled to a depth of about 65 mm. with 4 mm. glass beads 16 supported near the lower end 15 of the tube by larger beads 17 resting on Vigreaux indentations 18 in the wall of the tube 13.

The conductivity cell 2 is formed of a 10 mm. Pyrex glass tube 21 about 20 cm. long, connected at its upper end 22 to the lower end 15 of the scrubber 1. Two platinum electrodes 23 and 24, each about 16 sq. mm. in area, are mounted in the tube 21, about 6 cm. from its upper end 22 and spaced about 6 mm. apart, on platinum wires 25 and 26 which pass through the wall of the tube 21 through sealed joints. The portion of tube 21 carrying the electrodes is enclosed in a glass envelope 27, for electrically insulating the wires 25 and 26 from the surroundings, and the tube 21 and envelope 27 are mounted in a sleeve 28, formed of Bakelite or other insulating material, in which are mounted binding posts 29 and 30 to which the wires 25 and 26, which pass through the wall of the envelope 27 through sealed joints, are respectively connected. The binding posts 29 and 30 are connected through leads 31 and 32 with an electrical measuring and recording instrument 3, which in turn is connected by leads 33 and 34 to a source of 110-volt 60-cycle alternating current.

The measuring and recording instrument 3 may be any suitable instrument or combination of instruments for measuring and recording the conductance of the solution passing between the electrodes 23 and 24. Thus, it may be an ordinary Wheatstone bridge having the usual pairs of resistance arms, one arm consisting of the circuit formed by the leads 31 and 32, wires 25 and 26 and the aqueous solution of sulfur dioxide between the electrodes 23 and 24 whose conductivity is to be determined, and an alternating current galvanometer for measuring the degree of unbalance in the bridge circuit and thereby changes in resistance (conductance) of the sulfur dioxide solution between the electrodes 23 and 24. Instruments of this type, which include means for instantaneous and continuous recording of changes in resistance of the Wheatstone bridge arm, and the operation of such instruments are well known in the art. One type is available in industry as "Micromax" recorders.

The scrubber 1 and conductivity cell 2 are jointly mounted in a tube 91 of large diameter having upper and lower closures 92 and 93, the scrubber 1 and gas duct 6 passing through and being supported by the upper closure 92, and the conductivity cell 2 passing through and being supported by the lower closure 93. The space within the tube 91 surrounding the scrubber 1 and conductivity cell 2 is filled with thermally conductive packing material 94 (such as, aluminum granules, carbon, or the like) thereby providing the temperature-regulating jacket 9 for the scrubber 1, conductivity cell 2 and gas duct 6 whereby they are maintained at a substantially uniform temperature. The tube 91 is surrounded by an electrical heating jacket 10 which is connected by leads 101 and 102 to a relay 103, which in turn is connected by leads 104 and 105 with the source of alternating current. The relay is controlled by a thermostat 106 which projects through the closure 93 into the bed of thermally conductive material 94 in the temperature-regulating jacket 9 and which is connected to the relay by leads 108 and 109. The temperature-regulating jacket 9 is also provided with a thermometer 110 for indicating the temperature in the jacket.

The lower, exit end of the tube 21 is connected by rubber tubing 51 with an inverted U-tube 52 for discharging liquid from the conductivity cell 2 into a receiver 53, by means of which the rate of liquid flowing through the apparatus may be observed. The inverted U-tube 52 is adjustably mounted so as to permit vertical adjustment of the liquid level B—B of the liquid in the conductivity cell 2.

The constant level device for supplying water to the scrubber consists of a closed vessel 40 connected by a syphon tube 42 and air tube 43 with a water reservoir 41 which is closed by a removable cover 44. The tubes 42 and 43 are spaced sufficiently apart in vessel 40 to prevent air bubbles from entering tube 42. The closed vessel 40 is also connected by an air tube 45 with a closed air chamber 46 which is connected to the atmosphere through an air inlet tube 47. The vessel 46 is partly filled with aqueous sodium hydroxide solution, which acts as a liquid seal for the inner end of tube 47 and serves to remove sulfur dioxide from the air entering the apparatus through tube 47. Tubes 42, 43, 45 and 47 are so constructed and arranged as to maintain a substantially constant liquid level in the vessel 40. Thus tubes 42 and 43 terminate in the reservoir 41 near the bottom thereof. Tube 43, which supplies air to the reservoir 41 to replace water removed therefrom, terminates above the liquid level in vessel 40. Tube 42, which supplies water to vessel 40 by a syphon action, terminates considerably below the liquid level in vessel 40 so as to maintain a liquid seal for tube 42. The lower end 48 of tube 45, which acts as the control of the liquid level in vessel 40, terminates in vessel 40 at the desired liquid level A—A and terminates in vessel 46 within the air space, considerably above the level of sodium hydroxide solution in vessel 46. The outlet 49 of the vessel 40 is connected to tube 5, which is preferably formed of capillary tubing and provided with a valve 50 for controlling the flow of water into the scrubber 1.

In operation, the tube 45 serves as a valve for controlling the liquid level in vessel 40; when the level A—A drops below the end 48 of the tube 45 in vessel 40, air is admitted into reservoir 41 through tube 43, tube 45, and tube 47 (through the sodium hydroxide seal in vessel 46), thereby permitting water to syphon into vessel 40 through tube 42 from the reservoir 41. When the level of liquid in vessel 40 rises sufficiently to cover the end 48 of tube 45, the flow of air into the reservoir 41 is shut off, thereby shutting off the flow of water through the syphon tube 42.

Sulfuric acid trap 8, as shown more clearly in Figure 3 of the drawings, consists of a chamber 81 having a gas inlet 82 and a gas outlet 83 in which is mounted a perforated conical baffle plate 84 with its apex downward. The inlet 82 of the trap 8 is connected to a T-coupling 86, one arm of which is connected to a pipe 87 which leads to the source of gases to be measured, shown in the drawings as the gas flue 12. The other arm of the T-coupling 86 is closed by a removable clean-out plug 88. The pipe 87 is slightly inclined downward so as to return any liquid sulfuric acid to the flue 12. The trap 8, conical baffle 84 and connections are preferably fabricated of lead to increase the efficiency of the trap by supplementing the physical effect of the change in velocity produced in the trap by the chemical action of the lead on the small amount of sulfuric acid which may be present. As required, lead sulfate which accumulates in T-connection 86 is removed by opening plug 88.

The flow meter 7, which is connected to the gas duct 6 by a tube 61 and to the sulfuric acid trap 8 by a tube 62, may be of any usual construction, such as a by-pass U-tube containing an inert liquid and calibrated to show the volume of gas flowing through the apparatus. Inasmuch as the exit gases from the sulfuric acid process are at substantially atmospheric pressure at the point usually desired for testing, suction means (not shown) are connected to the exhaust conduit 11 for the purpose of drawing the gases to be tested through the apparatus, the gas flow through the apparatus being controlled by a valve 20 in the conduit 11.

In preparing the apparatus for operation, the platinum electrodes of the conductivity cell 2 are cleaned with warm chromic acid and then platinized by closing off tube 51 and filling the cell to a point above the electrodes 23 and 24 with a 3% aqueous solution of chloroplatinic acid containing 0.03% of lead acetate, connecting the binding posts 29 and 30 to a source of 3-volt direct current, and electrolyzing for four to five minutes, reversing the current every thirty seconds. A black platinum deposit is formed on the electrodes. As a precaution, occluded gases and liquid in the coating may be removed, after emptying the cell and rinsing with distilled water, by electrolyzing dilute sulfuric acid solution in the cell for ten minutes, reversing the current every minute.

After rinsing with distilled water, the cell is connected to the scrubber 1 by a suitable clamp, not shown, and the apparatus is assembled as shown in Figure 1.

The apparatus is then calibrated in the following manner: The cover 44 of the reservoir 41 is removed, the reservoir is substantially filled with distilled water or other water suitable for conductivity measurement (preferably, water of known or standardized substantially constant electrical conductivity), and the cover 44 is closed. Vessel 46 is filled with 1 Normal sodium hydroxide solution to a depth of several inches. Tube 42 is filled with distilled water from the reservoir 41 so as to form a syphon discharging into vessel 40. Preferably, the effective head should not exceed six inches, for a scrubber and conductivity cell of the dimensions given above.

The valve 20 in the gas outlet 11 of the scrubber is adjusted until the flow meter 7 indicates a gas flow of about ten cubic feet per hour through the apparatus. Valve 50 is then opened and water is allowed to flow downward through the scrubber and fill the conductivity cell 2 and the lower part of scrubber 1. Tube 52 is lowered until liquid flows from it; then it is raised to a point above the level of the electrodes 23 and 24, and the flow of water is adjusted by valve 50 in tube 5 until tube 52 remains filled with water to the height of the bend 54 against the effect of the suction in the apparatus. Tube 52 is then gradually lowered while observing the conductivity indicated by the pointer 37 of the instrument 3. When the pointer 37 suddenly shifts to the end of the scale registering zero conductivity, thereby indicating that the level of liquid in the conductivity cell 2 has fallen below the electrodes 23 and 24, tube 52 is then raised one inch and clamped in that position. This establishes the level B—B of the solution in the conductivity cell 2 at a sufficient height above the electrodes 23 and 24 to avoid their becoming uncovered if the pressure in the scrubber should increase slightly during operation, and yet reduces to a practical minimum the amount of solution to be displaced in the zone of conductivity measurement between electrodes 23 and 24, thus reducing the time interval for response of the apparatus to variations in the sulfur dioxide concentration of the gases undergoing test. The flow of water into the apparatus is then adjusted by adjustment of the valve 50, until the rate of flow of solution into receiver 53 is about 5 ml. per minute, for apparatus having the dimensions referred to above.

The thermostat 106 and relay control 103 are adjusted to maintain a temperature in the temperature-regulating jacket 9 of 40° C., as shown by the thermometer 110.

Air-sulfur dioxide mixtures, containing known concentrations of sulfur dioxide within the general range of the gases to be tested, are then passed through the apparatus, and the readings of the pointer 37 of the measuring and recording instrument 3 are calibrated in terms of the concentration of sulfur dioxide in the known gas mixtures.

The apparatus is then installed in a suitable location in the plant and connected to the test point in the flue 12 by a suitable connection to the inlet 87.

An apparatus of the type above described and illustrated in the drawings was employed for the determination of the sulfur dioxide content in the flue gases from the manufacture of sulfuric acid by the contact process, having a composition similar to that referred to above. A stream of the gases at a rate of 10 cu. ft. per hour was passed through the apparatus maintained at a temperature of 40° C., and the electrical conductivity of the solution of sulfur dioxide in distilled water formed in the scrubber 1 was continuously measured and recorded as an index of the sulfur dioxide content of the gases for a period of months. As evidenced by checks against spot analyses of the gases by the Reich test, referred to above, the maximum error in concentration of sulfur dioxide shown by the apparatus over this long period of continuous operation was only 1% of the total sulfur dioxide present in the gases.

It will be evident to those skilled in the art that the invention is not limited to the foregoing detailed description and that changes can be made without departing from the scope of the invention.

Thus, various forms of apparatus embodying the principles of the present invention can be employed. For example, other forms of scrubbers, in which a relatively small volume of liquid is intimately contacted with a relatively large volume of gas so as to attain rapidly conditions of equilibrium, can be substituted for the scrubber 1. While a constant liquid feed device is desirable for securing automatic operation with minimum supervision, it is not essential that a constant level device be employed in order to obtain measurement of the sulfur dioxide content of gas mixtures. Further, other forms of constant level devices may be employed.

The sulfuric acid trap also may be replaced by other means for removing sulfuric acid without substantial absorption of sulfur dioxide from the gases, and preferably by a change in the velocity of the gas mixture. Further, in the measurement of sulfur dioxide in gas mixtures which are substantially free from sulfuric acid, the sulfuric acid trap may be eliminated.

It is not essential that the conditions above described be maintained for efficient operation of the apparatus. Thus, substantially identical results are obtained throughout the following ranges of conditions:

Rate of gas flow—5 to 10 cu. ft. per hour
Rate of water flow—150 to 450 ml. per hour
Length of glass bead packing in scrubber—1 to 5 ft.

Thus, use of the apparatus of the present invention is not restricted to the exact proportioning of gas to liquid required by previously known apparatus. It is sufficient that merely an amount of gas be contacted with the stream of water to provide an excess over the equilibrium concentration of sulfur dioxide in water at the temperature and pressure of operation. Further, since operation of the apparatus depends upon the establishment of equilibrium conditions and not upon complete absorption of the sulfur dioxide from a sample of the gas to be tested, variations in the gas and liquid flow have no adverse effect upon the accuracy of the determinations. However, since standardization and control of conditions within practical limits simplify continuous operation without close supervision, they are preferred.

For efficient operation, it is desirable that the temperature and pressure be maintained substantially constant, otherwise the accuracy of the device will be adversely affected. The specific embodiment of the invention described above employs a temperature of 40° C. and substantially atmospheric pressure; but other combinations of temperatures and pressure can be employed by calibrating the apparatus for such temperature and pressure. Calibration of the apparatus above described at various temperatures from room temperature (about 20° C.) to 45° C. also gave substantially identical results other than a difference in the calibration curve. For ease in operation, temperatures below room temperature are less desirable since they require cooling, and temperatures above 45° C. are less desirable owing to the decreased solubility of sulfur dioxide in water.

It is a feature of the present invention that it provides for a volume of water passing downward through the scrubber 1 which is small as compared with the volume of gas in contact therewith at any time in the scrubber. As a consequence, the scrubber 1 is in effect an extended film of water of large surface area in contact with the gases, with the result that equilibrium conditions between the gas and the liquid are rapidly established. Since gas enters the scrubber near the bottom thereof, and passes countercurrent to the downwardly flowing solution of sulfur dioxide in water formed in the scrubber, the solution passing from the scrubber into the conductivity cell is substantially in equilibrium with the gas mixture entering the scrubber; and since the electrodes 23 and 24 are but a short distance below this point, the conductivity of the solution of sulfur dioxide is measured within a short time interval after contact with the entering gases. Hence, the measurement of the conductivity of the sulfur dioxide solution in the conductivity cell 2 provides an accurate measure of the concentration of sulfur dioxide in the gases entering the scrubber.

It is a further feature of the present invention that although sulfurous acid is oxidized to sulfuric acid by oxygen, and the presence of sulfuric acid in the sulfurous acid formed by absorption of sulfur dioxide in water markedly influences the conductivity of the sulfurous acid solution, the amount of sulfuric acid formed in the use of the apparatus of the present invention is insufficient to substantially affect the measurement of sulfur dioxide content, notwithstanding the substantial presence of oxygen in the tail gases.

The presence of carbon dioxide in sulfur dioxide-containing gases has little effect upon the results obtained, owing to the fact that the ionization constant of carbonic acid is much smaller than that of sulfurous acid.

While the invention has been described in connection with the determination and recording of sulfur dioxide in exit gases from the contact sulfuric acid process, it is not limited thereto but can be employed for the determination and recording of sulfur dioxide concentrations in other gas mixtures that are essentially free from other constituents which dissolve in water to form an electrolyte or which can be readily freed from such constituents without substantial reduction in the concentration of sulfur dioxide in the gas mixture. As employed herein and in the claims, the expression "gas mixtures that are essentially free from other constituents" includes gas mixtures containing constituents which dissolve in water to form an electrolyte having a considerably lower conductivity than that of sulfurous acid, as well as gas mixtures free from other constituents which dissolve in water to form an electrolyte.

The apparatus above described is especially adapted for the determination and recording of sulfur dioxide concentrations in gas mixtures wherein the concentration of sulfur dioxide ranges from 0.05 to 2.00%. Where a lesser degree of accuracy is permissible, the apparatus can be employed for the measurement of gas mixtures of considerably higher sulfur dioxide concentration, for example, gases containing 10% of sulfur dioxide.

This application is a division of my copending application Serial No. 100,269, filed June 20, 1949, now abandoned.

The process described above is claimed in my copending application Serial No. 630,168, filed December 24, 1956.

I claim:

1. Apparatus for continuously measuring the concentration of sulfur dioxide in a gas mixture which is essentially free from other constituents which dissolve in water to form an electrolyte, which comprises: first contact means for intimately contacting countercurrently a relatively large volume of the gas mixture with a relatively small volume of an aqueous solution of sulfur dioxide and second contact means for contacting the gas mixture containing sulfur dioxide with water to form said aqueous solution of sulfur dioxide; means for introducing the gas mixture into said first contact means, including a gas duct; means for withdrawing exit gases from said second contact means; an electrical conductivity cell adapted to receive sulfur dioxide solution produced in the first contact means, said cell having spaced electrodes for use in measuring the electrical conductivity of the solution; a liquid conduit connecting said cell to said first contact means; temperature-regulating means surrounding the first contact means, the gas duct and the conductivity cell for maintaining a substantially uniform temperature therein; means for maintaining the electrodes of the conductivity cell covered by said solution; and means for connecting the electrodes to electrical measuring means.

2. Apparatus for continuously measuring the concentration of sulfur dioxide in a gas mixture which is essentially free from other constituents which dissolve in water to form an electrolyte, which comprises: a scrubber for passing a relatively large volume of gas in intimate countercurrent contact with a relatively small volume of water; means for introducing a stream of water into the scrubber; a gas duct for introducing gas into the scrubber countercurrent to the steam of water at a place spaced from the place of introduction of water; an electrical conductivity cell connected to the scrubber near said place of introduction of gas for receiving aqueous solution formed in the scrubber and having electrodes immersed in the aqueous solution formed in the scrubber; thermostatically controlled temperature-regulating means surrounding the scrubber, the conductivity cell and the gas duct for maintaining a uniform temperature therein; a liquid duct for removing the solution from the conductivity cell; a liquid level control connected to the liquid duct for maintaining the electrodes of the conductivity cell covered by said solution; and means for connection of the electrodes to electrical measuring means.

3. Apparatus for continuously measuring the concentration of sulfur dioxide in tail gases from the manufacture of sulfuric acid by the contact process which comprises a scrubber for passing a relatively large volume of the gas countercurrent to, and in intimate contact with, a relatively small volume of water; means for introducing water into one end of the scrubber; a gas duct for introducing gas into the other end of the scrubber; a sulfuric acid trap connected with the gas duct, for removing sulfuric acid from the tail gases by change in the velocity of the gases prior to their entry into the scrubber; an exhaust conduit for withdrawing gas from said one end of the scrubber; an electrical conductivity cell connected to said other end of the scrubber and adapted to receive sulfur dioxide solution produced in the scrubber, said cell having spaced electrodes for use in measuring the electrical conductivity of the solution; electrical measuring means connected to the electrodes for determining the electrical conductivity of the solution as an index of the concentration of sulfur dioxide in the tail gases; temperature-regulating means surrounding the scrubber, the conductivity cell and the gas duct for thermostatically maintaining a substantially constant temperature therein; a liquid duct for removing the solution from the conductivity cell; and means connected to the liquid duct for maintaining the electrodes of the conductivity cell covered by said solution.

4. Apparatus for continuously measuring the concentration of sulfur dioxide in tail gases from the manufacture of sulfuric acid by the contact process which comprises a packed column; means for introducing water into the upper portion of the column; a gas duct for introducing tail gas into the bottom of the column; a sulfuric acid trap connected with the gas duct, for removing sulfuric acid from the tail gases prior to their entry into the gas duct, said trap having surfaces in contact with the gases formed of lead; a gas outlet near the top of the column for withdrawing gases from the column; a conductivity cell comprising a glass tube of smaller cross-sectional area than the column connected to the column below the gas inlet; two spaced platinum electrodes mounted within said tube near said gas inlet on platinum wires passing through the wall of the tube through sealed joints; an electrically insulating envelope enclosing said platinum wires; a jacket surrounding the column, the gas duct and the conductivity cell, said jacket containing a heat-conductive packing material; electrical heating means surrounding the jacket; a thermostat embedded in the packing in the jacket for controlling the electrical heating means; an adjustable liquid duct connected to the outlet of said tube for adjusting the liquid level in the tube; and electrical measuring means connected to the platinum wires for continuously measuring the electrical conductivity of the liquid passing between the electrodes as an index of the concentration of sulfur dioxide in the tail gas.

5. Apparatus for continuously measuring the concentration of sulfur dioxide in tail gases from the manufacture of sulfuric acid by the contact process which comprises: a packed column; means for introducing water into the upper portion of the column; a gas duct for introducing tail gas into the bottom of the column; a gas outlet near the top of the column for withdrawing gases from the column; a tube forming a conductivity cell, for receiving liquid from the column, connected to the column below the gas inlet; two spaced electrodes mounted within said tube near said gas inlet on wires passing through the wall of the tube through sealed joints; means for connecting said wires to electrical measuring means; an adjustable liquid duct connected to the outlet of said tube for adjusting the liquid level in the tube; and a thermostatically controlled temperature-regulating means including heat conductive material surrounding the column, the gas duct and the conductivity cell.

References Cited in the file of this patent

UNITED STATES PATENTS

| | | |
|---|---|---|
| 1,475,000 | Cooper et al. | Nov. 20, 1923 |
| 2,593,878 | Haines et al. | Apr. 22, 1952 |

OTHER REFERENCES

Thomas et al.: "Automatic Apparatus for Determination of Small Concentrations of Sulfur Dioxide in Air," Ind. and Eng. Chem. Anal. Ed., vol. 18, No. 5, pages 383–387 (1946).